Patented June 6, 1933

1,912,372

UNITED STATES PATENT OFFICE

RALPH A. JACOBSON, OF OMAHA, NEBRASKA, AND JOHN L. KEATS, OF WILMINGTON, DELAWARE, ASSIGNORS TO E. I. DU PONT DE NEMOURS & COMPANY, OF WILMINGTON, DELAWARE, A CORPORATION OF DELAWARE

METHOD OF COATING AND ARTICLE PRODUCED THEREBY

No Drawing. Original application filed June 12, 1929, Serial No. 370,450. Divided and this application filed July 17, 1930. Serial No. 468,727, and in Great Britain February 14, 1930.

This invention relates to the art of coating compositions and, more particularly, to coating compositions and systems of coating compositions which are adapted to relatively rapid drying schedules.

It has long been customary, in the finishing of articles with a series of coatings of paint, to allow one coating to thoroughly dry before a succeeding coating was applied. In the automobile industry, however, where speed of production is a material factor in keeping costs down, many efforts have been made to facilitate the painting operations. In one of these methods air drying is replaced by baking but, while this results in a material reduction of the drying time, this cannot be effected at above a certain range of temperature as it has a disadvantageous effect upon the body being painted, especially if, as is frequently the case, the body includes glued wood joints. Another method used to facilitate the painting is to use quick drying pyroxylin coatings, but these are expensive and adhere with difficulty to the metal of the body unless the latter has been perfectly cleaned, and this in turn is also difficult and expensive.

It has therefore been customary in recent years to build up the complete coating system by applying a series of non-pyroxylin undercoatings to secure good adhesion to the metal of the body and form a good base, baking each of these coatings separately, and then finishing by the application of one or more pyroxylin top coatings, accompanied by suitable sanding operations.

The present invention is directed generally to the system of coatings below the top coatings, which series of coatings will be referred to herein as the "undercoating system", and primarily to the surfacer coatings.

The present invention is also directed primarily to undercoating compositions and undercoating systems which are free from cellulose derivatives, to the methods of making and applying such undercoating compositions and systems and to articles provided with such undercoating systems.

By the terms "polyhydric alcohol-polybasic acid resin", as used herein, we mean products which comprise the reaction product of one or more polyhydric alcohols, at least one polybasic acid, with or without monobasic acids, and one or more oils or oil acids, and/or natural gums.

By the terms "oil type" or "oil type vehicle", as used herein, we mean products which contain appreciable quantities of drying or semi-drying oils and include natural gums or synthetic gums, such as ester gum modified phenol formaldehyde resins and other phenol formaldehyde rosin condensation products; we also include polyhydric alcohol-polybasic acid resin varnishes formed by heating a preformed polyhydric alcohol-polybasic acid resin with the desired oil or oils according to regular varnish procedure.

By the term "primer", as used herein, we mean coating compositions which, in addition to possessing any other properties specifically mentioned in connection with them, are also adapted to fulfill the functions of products known in the art as primers, which are compositions that are used to provide adhesion between the succeeding coating and the surface to which the whole coating system is applied, such primers possessing properties of toughness, flexibility, adhesion to the surface over which they are applied, and ability to resist penetration by the solvents of coatings applied thereto.

By the terms "surfacer" and "surfacer coating", as used herein, we mean coating compositions which, in addition to possessing any other properties specifically mentioned in connection with them, are also adapted to fulfill the functions of products known in the art as surfacers, which are compositions that are used to fill up irregularities and permit sanding in order to obtain a smooth surface for the reception of the finishing coatings, such surfacers possessing the properties of high build, toughness, flexibility, adhesion to the coatings over which they are applied, and ability to resist penetration by the solvents of coatings applied thereto.

By the term "polyhydric alcohol-polybasic acid resin surfacer", as used herein, we mean a surfacer in which the major proportion of the film forming ingredients other than pigment is one or more polyhydric alcohol-polybasic acid resins, as defined herein.

By the term "oil type surfacer", as used herein, we mean a surfacer in which the major proportion of the film forming ingredients other than pigment is an oil type product, as defined herein.

By the term free from cellulose derivatives, as used herein, we mean that the material referred to does not contain cellulose derivatives.

By the expression "ratio of pigment to binder", as used herein, unless otherwise qualified, we mean to include the total pigments and fillers in the term "pigment", and to include all the non-volatile constituents of the vehicle, such as oil, polyhydric alcohol-polybasic acid resin, natural resin, drier and softener, in the term "binder", the ratio being expressed on a weight basis.

By the term "oil content", as used herein, we mean the number of gallons of oil per 100 pounds of gum, commonly called the oil length, when referring to oil type vehicles, and the per cent of oil in the reaction product when referring to polyhydric alcohol-polybasic acid resins.

By the term "units of oil", as used herein, we mean the number of parts, by weight, of oil present in the composition per 100 parts of pigment present.

By the term "drying", as used herein, we do not refer to short intervals of time, i. e. periods up to 15 minutes, allowed for the evaporation or flashing off of solvents.

We have discovered that it is possible to shorten the drying schedules of undercoating systems by drying the primer and then drying all the surfacer coatings simultaneously in a second drying operation, provided the surfacer has the characteristics indicated below.

We have also discovered that it is possible to apply all the coatings of the undercoating system in rapid succession without intermediate baking and then dry all of these coatings in a single operation provided certain precautions are taken, as set forth in detail hereinafter.

It is thereafter an object of this invention to provide coating compositions which will set up quickly when applied as thick films.

It is another object of this invention to provide a system of undercoating in which a plurality of coatings may be applied one after another without intermediate baking and be dried by a single drying operation.

It is a further object of this invention to provide a system of undercoating in which all of the undercoatings may be applied one after another without intermediate baking and be dried by a single baking or air drying operation.

It is a still further object of this invention to provide a system of undercoating automobiles in which the entire system may be applied and dried in not to exceed 3 hours at 160° F., or its equivalent period at a different temperature.

It is also an object of this invention to provide a method of control for the manufacture of coating compositions and undercoating systems which will permit rapid drying by a single air drying or baking operation into a film possessing all of the desired characteristics of flexibility, adhesion, sanding, texture, toughness, hardness, heavy build, good filling, a minimum of porosity, non-pitting, non-lifting, non-popping, non-softening, and non-bleeding.

With the above and other objects in view, which will be apparent as the description proceeds, we have set forth our invention in the following specification and have included several typical examples of undercoatings embodying our invention by way of illustration and not as a limitation, the figures given representing parts by weight.

*Polyhydric alcohol—polybasic acid resin surfacers*

|  | Example 1 Oxide type | Example 2 Gray type |
|---|---|---|
| Ingredients: |  |  |
| Pigments: |  |  |
| Iron oxide | 20.52 |  |
| Lampblack | 3.48 |  |
| Asbestine | 4.35 | 9.84 |
| China clay | 10.88 | 4.64 |
| Blanc fixe | 4.36 |  |
| Litharge | .85 |  |
| Lithopone |  | 11.62 |
| Carbon black |  | .11 |
| Barytes |  | 17.25 |
| Silica |  | 8.71 |
| Non-volatile vehicle: |  |  |
| Polyhydric alcohol-polybasic acid resin A | 10.83 |  |
| Polyhydric alcohol-polybasic acid resin C |  | 10.70 |
| Ester gum | 2.13 |  |
| Dibutyl phthalate | .53 | .95 |
| Drier |  | .35 |
| Special ingredient: |  |  |
| Eugenol |  | .054 |
| Solvents: |  |  |
| Hi-flash naphtha | 29.10 | 31.596 |
| Mineral spirits | 12.97 | 4.18 |
| Total | 100.00 | 100.00 |
| Oil absorption units of pigment combination | 34.01 | 20.25 |
| Ratio of Oil absorption units / Units of oil | 100/22.2 | 100/42.5 |

*Oil type surfacers*

|  | Example 3 Oxide type | Example 4 Gray type |
|---|---|---|
| Ingredients: |  |  |
| Pigments: |  |  |
| Iron oxide | 11.88 |  |
| Lithopone |  | 11.87 |
| Carbon black | .79 | .10 |
| Barytes | 15.79 | 15.92 |
| Whiting | 38.75 | 39.80 |
| Non-volatile vehicle: |  |  |
| 24-gal. China-wood—linseed oil varnish | 8.35 | 8.41 |
| Drier | .22 | .22 |
| Special ingredient: |  |  |
| Stearine pitch | .30 | .41 |
| Solvents: |  |  |
| Mineral spirits | 14.66 | 15.44 |
| Xylene | 9.26 | 7.83 |
| Total | 100.00 | 100.00 |

Oil type surfacers—Continued

|  | Example 3 Oxide type | Example 4 Gray type |
|---|---|---|
| Oil absorption units of pigment combination | 17.03 | 16.44 |
| Ratio of $\frac{\text{Oil absorption units}}{\text{Units of oil}}$ | 100/47.4 | 100/49.1 |

As examples of suitable primers and putties for use with our new surfacers, especially in single baking systems, or in systems in which all the surfacers are baked simultaneously, we have set forth the following:

Primers

|  | Example 5 Polyhydric alcohol-polybasic acid resin oxide type | Example 6 Oil oxide type |
|---|---|---|
| Ingredients: |  |  |
| Pigments: |  |  |
| Iron oxide | 8.22 | 7.69 |
| Lampblack | 1.59 | 3.03 |
| Asbestine | 3.78 | 3.47 |
| China clay | 4.73 | 4.46 |
| Talc | 3.78 | 3.54 |
| Litharge | .35 |  |
| Non-volatile vehicle: |  |  |
| Polyhydric alcohol-polybasic acid resin B | 11.82 |  |
| 24-gal. China wood—linseed oil varnish |  | 12.40 |
| Drier |  | .21 |
| Solvents: |  |  |
| Hi-flash naphtha | 20.85 |  |
| Mineral spirits | 18.26 | 30.08 |
| Turpentine |  | 6.97 |
| Toluene | 26.62 | 28.15 |
| Total | 100.00 | 100.00 |
| Oil absorption units of pigment combination | 36.9 | 43.77 |
| Ratio of $\frac{\text{Oil absorption units}}{\text{Units of oil}}$ | 100/65.7 | 100/84.1 |

Polyhydric alcohol-polybasic acid resin putties

|  | Example 7 Oxide knife type | Example 8 Gray knife type |
|---|---|---|
| Ingredients: |  |  |
| Pigments: |  |  |
| Iron oxide | 25.33 |  |
| Lampblack | 2.85 |  |
| Asbestine | 5.12 | 12.23 |
| China clay | 12.76 | 5.76 |
| Blanc fixe | 5.12 |  |
| Litharge | 1.02 |  |
| Lithopone |  | 14.35 |
| Carbon black |  | .14 |
| Barytes |  | 21.43 |
| Silica |  | 10.75 |
| Non-volatile vehicle: |  |  |
| Polyhydric alcohol-polybasic acid resin A | 12.79 |  |
| Polyhydric alcohol-polybasic acid resin C |  | 13.30 |
| Ester gum | 2.56 |  |
| Dibutyl phthalate | .64 | 1.17 |
| Drier |  | .42 |
| Special ingredient: |  |  |
| Eugenol |  | .066 |
| Solvents: |  |  |
| Hi-flash naphtha | 29.25 | 20.384 |
| Mineral spirits | 2.56 |  |
| Total | 100.00 | 100.00 |
| Oil absorption units of pigment combination | 34.01 | 20.25 |
| Ratio of $\frac{\text{Oil absorption units}}{\text{Units of oil}}$ | 100/22 | 100/42.5 |

Oil type putties

|  | Example 9 Oxide spray type (same as Example 3) | Example 10 Oxide knife type | Example 11 Gray spray type (same as Example 4) | Example 12 Gray knife type |
|---|---|---|---|---|
| Ingredients: |  |  |  |  |
| Pigments: |  |  |  |  |
| Iron oxide | 11.88 | 13.68 |  |  |
| Lithopone |  |  | 11.87 | 13.62 |
| Carbon black | .79 | .91 | .10 | .12 |
| Barytes | 15.79 | 18.25 | 15.92 | 18.30 |
| Whiting | 38.75 | 44.66 | 39.80 | 45.69 |
| Non-volatile vehicle: |  |  |  |  |
| 24-gal. China wood—linseed oil varnish | 8.35 | 8.69 | 8.41 | 8.69 |
| Drier | .22 | .23 | .22 | .23 |
| Special ingredient: |  |  |  |  |
| Stearine pitch | .30 | .23 | .41 | .23 |
| Solvents: |  |  |  |  |
| Mineral spirits | 14.66 | 13.35 | 15.44 | 13.12 |
| Xylene | 9.26 |  | 7.83 |  |
| Total | 100.00 | 100.00 | 100.00 | 100.00 |
| Oil absorption units of pigment combination | 17.03 | 17.03 | 16.44 | 16.44 |
| Ratio of $\frac{\text{Oil absorption units}}{\text{Units of oil}}$ | 100/47.4 | 100/47.4 | 100/49.1 | 100/49.1 |

The resins referred to above were formed by heating together the following ingredients in the proportions (parts by weight) set forth below until the acid numbers were those indicated:

| Ingredients | Resin A | Resin B | Resin C |
|---|---|---|---|
| Glycerol | 23.1 | 19.3 | 16.72 |
| Linseed oil acids | 30.8 | 29.6 |  |
| Phthalic anhydride | 46.1 | 37.6 | 26.91 |
| China wood oil |  | 13.5 |  |
| Rosin |  |  | 18.17 |
| China wood oil acids |  |  | 38.20 |
|  | 100.0 | 100.0 | 100.00 |
| Acid number | 52 | 30 | 20 |

We have found it desirable, however, in making resin C, to heat the glycerol and phthalic anhydride until a homogeneous resin is obtained, then work in the rosin, and finally add the China wood oil acids and heat to the desired acid number.

In the above examples the vehicle used in the oil type compositions may be made with any of the ordinary varnish gums in conjunction with China wood oil and linseed oil, provided there is a preponderance of China wood oil.

In the above examples the quantities of drier indicated refer to amounts of a mixture of lead and manganese resinates and linoleates, which mixture contains 14% lead and 4.5% manganese.

Examples of suitable systems embodying our invention are:

POLYHYDRIC ALCOHOL-POLYBASIC ACID RESIN SYSTEMS

EXAMPLE 13

*Oxide products*

The primer of Example 5
The putty of Example 7
The surfacer of Example 1

Example 14

*Oxide and gray products*

The primer of Example 5
The putty of Example 8
The surfacer of Example 2

OIL TYPE SYSTEMS

Example 15

*Oxide products*

The primer of Example 6
The putty of Example 9
The surfacer of Example 3

Example 16

*Oxide and gray products*

The primer of Example 6
The putty of Example 11
The surfacer of Example 4

MIXED SYSTEMS

Example 17

*Oxide products*

The primer of Example 5
The putty of Example 10
The surfacer of Example 3

Example 18

*Oxide and gray products*

The primer of Example 6
The putty of Example 8
The surfacer of Example 2

As indicated by the above examples, the advantages of our invention may be obtained by either polyhydric alcohol-polybasic acid resin systems, oil type systems or combinations of these systems, and the putty and surfacer coatings may be of various types, such as oxide coatings or gray coatings. On account of the rapid drying of polyhydric alcohol-polybasic acid resin surfacers, however, it is not practicable to apply such surfacers over oil type primers unless the latter are previously dried.

Although a putty coating has been included in each of the above systems, we desire to have it specifically understood that the putty coating may be omitted from any of the systems indicated above, and from all of the systems falling within the scope of our invention, provided the surface, to which the system of undercoatings is to be applied, is sufficiently smooth so that the putty coating is not needed to fill up irregularities in that surface, or if the standards of acceptable quality of the finished product do not demand the optimum results. We also desire to have it understood that the putty may be made of a consistency suitable for application as a knife glaze, as indicated by the compositions of Examples 7, 8, and 10 used in the systems of Examples 13, 14, and 17 above, or may be diluted by volatile solvents, such as those disclosed herein, to enable it to be applied as a spray glaze. In practice, however, we have found it convenient and satisfactory to also use the undiluted surfacers as spray glazes as indicated by the compositions of Examples 9 and 11 used in the systems of Examples 15 and 16 above.

While the specific characteristics necessary in an undercoating system vary with the particular product being painted, and the arbitrary standards of acceptability which are set up, it may be said in general that the characteristics of such systems, especially for automobile bodies, are substantially as follows:

*Flexibility and adhesion.*—The various coatings should adhere to each other and the complete built-up system should adhere to the metal and not chip off in relatively large pieces, but should tend to strip off as a ribbon when scratched. In other words it should show definite tendency toward chewiness when cut with a knife, and be of a non-shattering character, and it must not develop cracking and checking on normal weathering.

*Toughness.*—When a knife is drawn across the surface with a scraping action the film should not chip or show chalkiness.

*Hardness.*—The film must offer considerable resistance to penetration or scraping off in the customary finger-nail test, in order to withstand sanding, and be hard throughout.

*Sanding.*—In wet sanding operations the composition must not gum up the sandpaper, it must not sand too hard or too slowly, and it must not have objectionable drag, that is, an undue tendency to pull the paper out of the operator's hand.

*Texture.*—The film must be sufficiently free from grit so that objectionable scratching is not encountered during the sanding operations, and to avoid pull-outs, that is, dislodgment of gritty particles with the resulting blemishes in the surface.

*Minimum of porosity.*—The film must be sufficiently non-porous so that it will not exhibit an objectionable blotter action when the top coatings are applied, with a resultant "sinking in" of the latter. In practice non-porosity of the undercoatings is spoken of in terms of their "holding out" properties for the color coating.

*Pitting.*—The film must not show pitting, that is, very small depressions in the color coating which give the appearance of pinholes.

*Lifting.*—The film must not become loosened and shrivel, surface crinkle or induce pitting when the top coatings are applied.

*Popping.*—The film must not form bubbles or blisters on application of the top coating, due to the evolution of gas from the undercoating structure at local spots.

*Feathering.*—The film must feather satisfactorily, that is, when the operator cuts through the separate coatings there must not be a jagged appearance between the exposed edges of adjacent coatings.

*Softening.*—The film must not become soft or mushy under the action of water during the rubbing operations, and should not be rapidly softened under the action of petroleum thinners.

*Build.*—The film must dry satisfactorily in heavy coatings, such as are necessary to fill scratches and other irregularities in the surface to which the film is applied, and must give a smooth surface on sanding.

*Drying.*—The film must dry all the way through instead of being mushy at the bottom and hard at the top, which is known as case hardening, and it must dry with sufficient rapidity and uniformity so that it will not undergo further drying with contraction in volume, as these will lead to failures, such as checking and cracking, on normal exposure.

*Non-bleeding.*—Ingredients of the undercoatings must not be absorbed by the color coating so as to affect the shade or other qualities of the latter.

By our invention we are able to obtain all of the above characteristics, accompanied by the special ability to effect satisfactory drying of complete undercoating systems by a single short baking period, that is, by a single baking period of not over 3 hours at 160° F. or its equivalent period at a different temperature. The five typical systems given in Examples 13–17 above will all meet these requirements and, when applied with one primer coating, one putty coating and one, two or three surfacer coatings, have produced satisfactory films by baking 2 hours at 160° F. The typical system given in Example 18 is not adapted for drying by a single baking operation, but is especially adapted for a double baking operation in which the primer is baked for 1 to 2 hours at 160° F. and then the putty and two or three surfacer coatings are baked for an additional 2 hours at 160° F.

In practice, where all the undercoatings are to be dried simultaneously, we have found it desirable to allow the primer coating to stand for a period of from five to fifteen minutes to allow the solvents to flash off, after which the putty is applied as a knife glaze or spray glaze if a putty coating is to be used, and this is immediately followed by the application of the desired number of surfacer coatings, preferably by spraying, without waiting for intermediate drying, i. e. for longer than ten minutes to allow partial evaporation of solvents, between these coatings. The system is then dried by baking for not to exceed 3 hours at 160° F., or its equivalent period at a different temperature.

Where a multiple baking is not objectionable the same procedure is preferably followed, except that the primer is preferably pre-baked, e. g. for 2 hours at 160° F., and the putty and surfacer coatings are then applied and baked in a second operation for not to exceed 3 hours at 160° F., or its equivalent period at a different temperature.

In practice it has been found that the presence of a large amount of solvent facilitates the leveling when a coating of surfacer is being sprayed, and it is therefore customary to dilute the coating composition with varying amounts of solvent according to the spraying viscosity desired. For example, the surfacers given in Examples 3 and 4 have been found to spray more satisfactorily when diluted with 10% by volume of mineral spirits.

The specific surfacer compositions which may be used in the carrying out of our invention may be varied within relatively wide limits, as follows:

The pigment combinations for both polyhydric alcohol-polybasic acid resin and oil type products may vary in regard to their chemical compositions and their physical properties:

(a) Their chemical compositions may vary widely in iron oxide content for oxide products. In gray products the lithopone may be replaced by titanox or white lead pigments, and these may likewise be varied over wide limits. The lampblack may be replaced by other blacks, such as carbon black and Keystone filler. Fillers, such as asbestos, China clay, blanc fixe, barytes, silica, whiting, and talc, are generally interchangeable except for limitations as specified below. Likewise, when desired, a buff material can be prepared by using lithopone and a yellow pigment, such as an ochre, in place of the iron oxide. In the case of certain polyhydric alcohol-polybasic acid resin products based on vehicles having relatively high acid values, such as those exceeding an acid number of 10 calculated on the non-volatile vehicle solids, and also in the case of certain oil type vehicles which tend to be reactive with basic pigments, such as Congo-China wood oil varnishes, instances are encountered where pigments such as zinc oxide, whiting, and lead carbonate, must be excluded to avoid livering or thickening of the compositions in their containers during the period of storage prior to use. In general, however, we do not wish to limit ourselves to any particular pigment combinations in so far as limitations of chemical compositions are concerned.

(b) Their physical properties. Relatively large percentages of talc in undercoating products for use under pyroxylin top coatings should be avoided as otherwise good anchorage or adhesion of the top coatings to the undercoating system is likely to be sacrificed. Further, we have observed that a predominance of hard fillers, such as barytes and silica, should usually be avoided in putties and surfacers, except in the case of products designed for "bricking", due to the hard sanding properties they impart to surfacers. It is likewise desirable to select pigments and fillers of relatively good texture or fineness, as otherwise excessive and costly grinding is required to eliminate the grit which would cause objectionable sand scratching of the surface during sanding. Pigments which lead to bleeding upon application of the top coatings should also be avoided. The oil absorption value of the pigment composition is of primary importance and is discussed in detail in the following paragraphs.

By the term "oil absorption", as used herein, we mean the number of parts, by weight, of acid refined linseed oil, having an acid number of 6 to 8, which are required to wet 100 parts by weight of the pigment to a predetermined consistency. The total oil absorption units for any given pigment combination is determined directly or by multiplying the weight of each pigment used, expressed in terms of percentage of the total pigment combination, by its oil absorption, and adding these figures.

For example, applying this to the pigment combination of the surfacer of Example 2, the total oil absorption of the pigment combination is arrived at as follows:

| Pigments | Weight in percentage of total pigment combination | Oil absorption of pigment | Oil absorption units per quantity of pigment used |
|---|---|---|---|
| Asbestine | 18.86 | 25.6 | 4.83 |
| China clay | 8.90 | 38.0 | 3.38 |
| Lithopone | 22.26 | 17.0 | 3.78 |
| Carbon black | .21 | 129.9 | .27 |
| Barytes | 33.05 | 11.4 | 3.77 |
| Silica | 16.72 | 25.3 | 4.22 |
| | 100.00 | | 20.25 |

While various methods may be used for determining the oil absorption of the pigments used, the values will vary with the method selected, and the figures given herein are based on the following spatula method, which was described in The Paint, Oil & Chemical Review for May 7, 1924, on page 10, and is the one we prefer to use:

Weigh out 5 grams of the pigment and spread it over a finely ground glass plate in a layer about 1½" wide and 3 to 4" long. Substantially fill a 10 cc Lunge type pipette with the linseed oil and weigh it. Add 20 drops of oil to one end of the pigment layer and mix these with a fairly stiff spatula until a stiff putty-like paste is formed. Add 5 drops of oil and work this into the paste with a gentle but firm pressure until a seepy paste is formed. Gradually add the untouched dry pigment until the paste becomes stiff again. Repeat until all the dry pigment is worked into a stiff putty-like ball, gradually reducing the amount of oil used. Add one more drop of oil and work this into the paste.

Collect all the paste into a ball and place it on the blade of a spatula, near the handle. Gently transfer the ball to a spatula having a ¼" blade by running the latter underneath the ball. Turn the spatula down and very gently throw the ball off. If no paste clings to the spatula add one more drop of oil and work it into the ball. Repeat until some paste clings to the spatula. Reweigh the pipette and calculate the oil absorption as grams of oil per 100 grams of pigment. All operations are carried out at 50% relative humidity at 25° C. in a constant temperature, constant humidity room.

*Grinding.*—We have also found that the method and degree of grinding of the undercoating compositions has a material effect upon the apparent oil absorption, that is, the original total oil absorption of the pigment combination may be either slightly or greatly increased according to the method and degree of grinding selected, the oil absorption increasing with the fineness of the grinding. The limits of allowable determined oil absorption values of pigment compositions suitable for use as disclosed herein hold true irrespective of grinding conditions, but the ratio of oil absorption units to units of oil in the optimum products decreases with increased grinding. Our experiments have been based for the most part on short ball mill grinding procedures, which we have found to answer satisfactorily the grinding requirements. From a practical viewpoint, however, the grinding may be done in a ball mill, buhrstone mill, roller mill, colloid mill, or other common grinding equipment. Suitable periods of grinding of the undercoating compositions for most pigment combinations are, for example, in the case of the ball mill, 6 hours with a charge of two parts by weight of balls to one part by weight of material; a single passage through 30" or larger buhrstone mills; or a roller mill set to produce a corresponding degree of fineness.

The polyhydric alcohol-polybasic acid resins used in the polyhydric alcohol-polybasic acid resin compositions set forth above may be replaced by other polyhydric alcohol-polybasic acid resins which also have sufficient oil chemically combined therewith to give satisfactory solubility and flexibility without materially retarding drying. For example, we have found that the oil content may vary from 23 to 50% in the case of linseed oil, and from 25 to 80% in the case of China wood oil, based on the weight of the dry resin composition. We may also use polyhydric alcohol-polybasic acid resins modified by natural gums chemically combined therewith to give satisfactory solubility, or polyhydric alcohol-polybasic acid resins modified by both gums and oils.

The non-volatile vehicles used in the oil type products may include any of the common natural gums, synthetic gums, such as ester gums, or Amberol or polyhydric alcohol-polybasic acid resins, as the gum constituents of these vehicles. Suitable oils include China wood oil, linseed oil, perilla oil, soya bean oil, and fish oil, although we prefer to employ a mixture of China wood oil and linseed oil, with the former predominating over the latter. The presence of China wood oil seems desirable as such oil compositions appear to dry by polymerization at the expense of oxidation, and the polymerization enhances the rapid drying of the resultant films. Where linseed oil predominates over China wood oil it appears preferable to select a vehicle of somewhat shorter oil length than in the case of the reverse type of vehicle. Perilla oil appears to behave much the same as linseed oil. The use of soya bean oil and fish oil generally leads to less satisfactory results, although the quality of the resultant products does not exclude them from the scope of this invention. Any desired mixtures of the oils indicated above, depending upon the rate of drying and other characteristics desired, may be used. The oil length of the non-volatile vehicle should not be less than 8 gallons, and is preferably not less than 12 gallons.

The volatile solvents may likewise be varied in all of the above systems, but it will be obvious that solvents whose evaporation rates are so slow as to seriously impede drying at moderate baking temperatures should not be used in sufficient quantities to be objectionable. We have found that Hi-flash naphtha, high boiling esters, turpentine, mineral spirits and toluene are desirable ingredients in polyhydric alcohol-polybasic acid resin products, although the Hi-flash naphtha and high boiling esters are not needed in oil type products. In the latter, mineral spirits, turpentine, xylene and toluene may be used separately or in various combinations with satisfactory results, although turpentine is especially useful when the product contains hard, natural gums. Similarly, in the polyhydric alcohol-polybasic acid resin products, the mineral spirits and toluene may be omitted and replaced by Hi-flash naphtha, high boiling esters or turpentine, although we have found, in general, that mixed solvents give better results in both polyhydric alcohol-polybasic acid resin and oil type products.

Although lead and manganese driers are indicated as having been used in the products sets forth above, it should be understood that other well known suitable driers, such as cobalt driers, may be substituted therefor and that slight variations may be made in the amounts of drier used without materially altering the drying schedule. In the case of oil type products, however, the optimum rate of drying for the composition under consideration can only be obtained by including sufficient drier in the composition.

Where desired, compositions falling within the scope of this invention may contain protective agents of various types, such as eugenol, to prevent objectionable skinning, stearine pitch to overcome objectionable pigment settling, and litharge to improve water resistance in certain polyhydric alcohol-polybasic acid resin products. Likewise, softeners, such as dibutyl phthalate, may be used in polyhydric alcohol-polybasic acid resin products.

In all of the systems falling within our invention we desire to have it understood that the top or color coatings applied may be of any desired type, whether pyroxylin, oil, or resin.

We have found that drying at the lower temperatures, such as 160° F., is preferable, but that where 200° F. or 250° F. are not objectionable a 1½-hour drying at 200° F. or a 1-hour drying at 250° F. is equivalent to a 3-hour drying at 160° F. For convenience of reference we have stated our drying time in terms of drying at 160° F. We have also found that our undercoating systems will attain a satisfactory hardness in air drying, that is, at room temperature of about 70–80° F., within approximately 15–24 hours for polyhydric alcohol-polybasic acid resin systems, and within 20–36 hours for oil and mixed systems.

We desire to have it understood that the key to successful single bake undercoating systems is in the formulation of the surfacer.

The characteristic feature of the present invention involves the discovery that much shorter drying schedules are possible with individual coatings and undercoating systems, as well as drying a plurality of coatings simultaneously, without sacrificing the desired properties of such coatings or systems, by properly relating the drying characteristics of the coating or coatings to the flexibility and toughness of the resulting film and to the lifting characteristics of the individual or collective coatings, as explained herein.

Our system of control, for the carrying out of the above discovery, and particularly for the production of coating compositions for use in systems in which all the surfacer coatings are dried simultaneously or in which the entire undercoating system is dried in one operation, is as follows:

*Polyhydric alcohol-polybasic acid resin surfacers*.—Formulate these from pigment combinations whose total oil absorption units do not exceed 50, use a polyhydric alcohol-polybasic acid resin having an oil content of not less than 23%, and maintain a ratio of pigment to binder high enough to avoid lifting when the top coatings are applied and low enough to avoid undue brittleness and lack of toughness. This ratio, expressed in terms of oil absorption units to units of oil, should be between 100:20 and 100:60.

*Oil type surfacers.*—Formulate these from pigment combinations whose total oil absorption units do not exceed 22, use a binder having an oil content of not less than 8 gallons, and maintain a ratio of pigment to binder high enough to avoid lifting when the top coatings are applied and low enough to avoid undue brittleness and lack of toughness. This ratio, expressed in terms of oil absorption units to units of oil, should be between 100:40 and 100:70.

While we have stated that pigment combinations whose oil absorption units do not exceed 50 and 22 are satisfactory for polyhydric alcohol-polybasic acid resin and oil type surfacers, respectively, we desire to have it understood that, as indicated by the compositions set forth in Examples 13—17, we prefer to use pigment combinations whose oil absorption units are appreciably less than 50 and 22 for polyhydric alcohol-polybasic acid resin and oil type surfacers, respectively.

It will be obvious that where the standards of acceptable quality are lower than those indicated above, or where longer drying periods or multiple bakings are not objectionable, greater variations in this method of control are permissible.

*Primers.*—Although we have stated limits for the allowable maximum oil absorption value of the pigment combinations of surfacer compositions coming within the scope of this invention, our experience indicates that satisfactory primer compositions may be formulated by selecting pigment combinations having oil absorption values anywhere within the range of practical primer pigment compositions and formulating the primer compositions therefrom in the same general manner as the surfacers.

This is particularly true when the primer is to be baked separately from the surfacer coatings, and when the entire undercoating system, including a relatively good surfacer, is to be baked in a single operation. However, if an oil type surfacer is used which is close to the limiting ratios of oil absorption units to units of oil, that is close to 100:40 or close to 100:70, the primer must be formulated with greater care to enable it to be dried simultaneously with the surfacer coatings, and in such cases the primer should approach the composition of Example 6 above for the best results.

In so far as film quality is concerned, the optimum results are obtained with primer compositions having as low a ratio of oil absorption units to units of oil as is possible without encountering lifting of the dried complete undercoating system upon application of pyroxylin top coatings.

It is a particular feature of polyhydric alcohol-polybasic acid resin primers that they set up to a sufficient hardness to allow the application of a knife glaze as soon as the solvents flash off, which is ordinarily within 5 to 15 minutes. On the other hand, if an oil type primer, such as indicated in Example 6, is used it should be subjected to several hours air drying or to a short baking period, as for example 1 hour at 160° F., before a knife glaze is applied thereover.

*Putties.*—Both polyhydric alcohol-polybasic acid resin putties and oil type putties are formulated in the same general manner as the surfacers except that they usually contain less solvent, but they may vary as discussed above.

By the term "film thickness", as used herein, we mean the thickness of the complete undercoating system, or the complete series of surfacer coatings, after the drying operation and before sanding, which results from the application of the required number of coatings without lapping, that is without traversing the same area more than once for any given coating.

It is a particular feature of our invention that, by following the method of control set forth herein, in the light of the entire disclosure of this application, we are enabled to secure satisfactory undercoating systems by the simultaneous baking of a plurality of coatings whose combined film thickness is at least .003″, thus making it possible to secure heavy build in conjunction with rapid drying schedules.

We desire to have it understood, however, that our invention includes the manufacture of the individual coatings when the system of control set forth above is utilized, or when compositions of the range indicated herein are used in undercoating systems, and that it also includes the simultaneous drying of a plurality of non-pyroxylin coatings which form a relatively thick film regardless of whether these constitute the entire undercoating system.

It will therefore be apparent that we have developed new and useful coating compositions and undercoating systems which form films that possess all of the desired characteristics, that our coating compositions and systems can be dried in much less time than former compositions and systems, and that any or all of the desired undercoatings may be applied one after another without intermediate baking and dried at one time to a satisfactory hardness.

No specific claims are made herein to coating compositions of the type set forth herein since these are claimed in our copending applications Serial Numbers 370,450 and 370,451, filed June 12, 1929. The present application is a division of Serial No. 370,450, and also embodies the subject matter of application Serial No. 468,728, which was a division of application Serial No. 370,451.

Similarly, no specific claims are made herein to mixed undercoating systems containing a separately dried oil type primer and a polyhydric alcohol-polybasic acid resin surfacer, as these features are claimed in our co-pending application Serial No. 370,452, filed June 12, 1929.

As many apparently widely different embodiments of this invention may be made without departing from the spirit and scope thereof, it is to be understood that we do not limit ourselves to the specific embodiments thereof except as defined in the appended patent claims.

We claim:

1. The method of coating articles which comprises applying a primer, applying a plurality of surfacer coatings which are free from cellulose derivatives without any intermediate baking of the individual coatings but allowing at least a portion of the volatile solvents of one coating to evaporate before the application of the next coating, drying all of the surfacer coatings with a single drying operation to a state that will permit sanding, and applying a top coating thereover.

2. The method of claim 1, in which the drying operation comprises a single baking for not to exceed 3 hours at 160° F., or its equivalent period at a different temperature.

3. The method of claim 1, in which the combined film thickness of the surfacer coatings is at least .003″ and in which the drying operation comprises a single baking for not to exceed 3 hours at 160° F., or its equivalent period at a different temperature.

4. The method of claim 1, in which the surfacer coatings are polyhydric alcohol-polybasic acid resin coatings.

5. The method of claim 1, in which the surfacer coatings are oil type coatings.

6. The method of claim 1, in which all of the primer and surfacer coatings are oil type coatings.

7. The method of coating articles which comprises spraying them with a plurality of dissimilar coatings which are free from cellulose derivatives in rapid succession but allowing at least a portion of the volatile solvents of one coating to evaporate before the spraying of the next coating, drying said coatings simultaneously to a state that will permit sanding and applying a top coating thereover.

8. The method of claim 7, in which the second coating is different from the first coating.

9. The method of claim 7, in which the second coating is different from the first coating and in which at least two coatings are alike.

10. The method of coating vehicles which comprises spraying them with a primer which is free from cellulose derivatives and subsequently with a plurality of coatings of surfacer which is free from cellulose derivatives without any intermediate baking of the individual coatings but allowing at least a portion of the volatile solvents of one coating to evaporate before the application of the next coating, then drying the entire system with a single baking for not to exceed 3 hours at 160° F., or its equivalent period at a different temperature, to a state that will permit sanding, and applying a top coating thereover.

11. The method of coating vehicles which comprises spraying them with a primer, applying a putty, and then spraying them with a plurality of coatings of surfacer without any intermediate baking of the individual coatings but allowing at least a portion of the volatile solvents of one coating to evaporate before the application of the next coating, all of said coatings being coatings which are free from cellulose derivatives, drying the entire system with a single baking for not to exceed 3 hours at 160° F., or its equivalent period at a different temperature, to a state that will permit sanding, and applying a top coating thereover.

12. A metal article coated by the process of claim 1, in which the combined film thickness of the undercoating system after drying and before sanding is at least .003″.

13. A metal article coated by the process of claim 10, in which the combined film thickness of the undercoating system after drying and before sanding is at least .003″.

14. A metal article coated by the process of claim 1, in which the combined film thickness of the undercoating system after drying and before sanding is at least .003″, and in which the surfacer coatings comprise polyhydric alcohol-polybasic acid resin products.

15. A metal article coated by the process of claim 10, in which the combined film thickness of the undercoating system after drying and before sanding is at least .003″, and in which the surfacer coatings comprise polyhydric alcohol-polybasic acid resin products.

16. A metal article coated by the process of claim 7, in which the combined film thickness of the coatings dried simultaneously is at least .003″.

17. A metal article coated by the process of claim 7, in which the combined film thickness of the coatings dried simultaneously is at least .003″, and in which the surfacer coatings comprise polyhydric alcohol-polybasic acid resin products.

18. The method of rapidly coating articles which comprises applying a primer, applying a plurality of oil type surfacer coatings without any intermediate drying of the individual coatings but allowing at least a portion of the volatile solvents of one coating to evaporate before the application of the next coating, drying all of the surfacer coatings with a single drying operation to a state that will permit sanding, and applying a top coating thereover.

19. The method of claim 18, in which the drying operation comprises a single baking for not to exceed 3 hours at 160° F., or its equivalent period at a different temperature.

20. The method of claim 18, in which the combined film thickness of the surfacer coatings is at least .003" and in which the drying operation comprises a single baking for not to exceed 3 hours at 160° F., or its equivalent period at a different temperature.

21. The method of coating vehicles which comprises spraying them with a primer which is free from cellulose derivatives and subsequently with a plurality of coatings of oil type surfacer which is free from cellulose derivatives without any intermediate baking of the individual coatings but allowing at least a portion of the volatile solvents of one coating to evaporate before the application of the next coating, then drying the entire system with a single baking for not to exceed 3 hours at 160° F., or its equivalent period at a different temperature, to a state that will permit sanding, and applying a top coating thereover.

22. The method of claim 21, in which an oil type primer is used.

23. The method of coating vehicles which comprises spraying them with a primer which is free from cellulose derivatives, applying a putty which is free from cellulose derivatives, and then spraying with a plurality of coatings of oil type surfacer which is free from cellulose derivatives without any intermediate baking of the individual coatings but allowing at least a portion of the volatile solvents of one coating to evaporate before the application of the next coating, then drying the entire system with a single baking for not to exceed 3 hours at 160° F., or its equivalent period at a different temperature, to a state that will permit sanding, and applying a top coating thereover.

24. The method of claim 23, in which all of the coatings are oil type coatings.

25. A metal article coated by the process of claim 18, in which the combined film thickness of the undercoating system after drying and before sanding is at least .003".

26. A metal article coated by the process of claim 21, in which the combined film thickness of the undercoating system after drying and before sanding is at least .003".

27. A metal article coated by the process of claim 18, in which the combined film thickness of the undercoating system after drying and before sanding is at least .003", and in which the primer is an oil type product.

28. A metal article coated by the process of claim 21, in which the combined film thickness of the undercoating system after drying and before sanding is at least .003", and in which the primer is an oil type product.

29. The method of claim 1, in which all of the primer and surfacer coatings are polyhydric alcohol-polybasic acid resin coatings.

In testimony whereof we affix our signatures.

RALPH A. JACOBSON.
JOHN L. KEATS.